United States Patent Office 3,178,410
Patented Apr. 13, 1965

3,178,410
21-ALKANE SULFONYLOXY, 21-IODO STEROIDS OF THE PREGNANE SERIES
Josef Fried and Josef E. Herz, New Brunswick, N.J., assignors to Olin Mathieson Chemical Corporation, New York, N.Y., a corporation of Virginia
No Drawing. Filed July 13, 1955, Ser. No. 521,915
7 Claims. (Cl. 260—239.55)

This invention relates to the synthesis of valuable steroids; and has for its objects the provision of: (I) an advantageous process of preparing steroids of the pregnane (including the pregnene, allopregnene, pregnadiene, and allopregnane) series, unsubstituted in the 21-position, and having a 9β,11β-oxido substituent; and (II) certain 21-alkanesulfonyloxy and 21-iodo compounds useful as intermediates in the preparation of these 21-unsubstituted, 9β,11β-oxido steroids.

The process of this invention essentially comprises: (a) converting a 21-hydroxy steroid of the pregnane series, having a 9β,11β-oxido substituent, into the corresponding 21 - alkanesulfonyloxy - derivative thereof; and (b) converting the latter into the corresponding 21-unsubstituted derivative, either directly or preferably through the 21-iodide derivative.

The novel compounds of this invention comprise: (A) 21-alkanesulfonyloxy - 9β,11β - oxido-steroids of the pregnane series; and (B) 21-iodo-9β,11β-oxido-steroids of the pregnane series.

The preferred 9β,11β-oxido compounds obtainable by the process of this invention are those which are comprehended by the general formula:

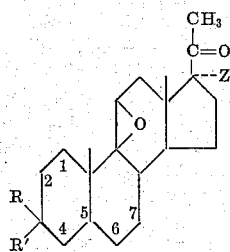

wherein at least one of the positions 1,2; 4,5; and 6,7 is double-bonded (those wherein the 1,2 and 6,7 positions are saturated and the 4,5-position is double-bonded being preferred), and wherein R is hydrogen, R' is hydroxy or together R and R' is a keto or ketalized keto group (preferably the free keto group), and Z is hydrogen or α-hydroxy.

Representative steroids preparable by the process of this invention include:

Δ⁴-pregnene-9β,11β-oxido-17α-ol-3,20-dione;
Δ⁴-pregnene-9β,11β-oxido-3,20-dione;
Δ¹-pregnene-9β,11β-oxido-17α-ol-3,20-dione;
Δ¹-pregnene-9β,11β-oxido-3,20-dione;
Δ¹-allopregnene-9β,11β-oxido-17α-ol-3,20-dione;
Δ¹-allopregnene-9β,11β-oxido-3,20-dione;
Δ¹,⁴-pregnadiene-9β,11β-oxido-17α-ol-3,20-dione;
Δ¹,⁴-pregnadiene-9β,11β-oxido-3,20-dione;
Δ⁴,⁶-pregnadiene-9β,11β-oxido-17α-ol-3,20-dione; and
Δ⁴,⁶-pregnadiene-9β,11β-oxido-3,20-dione.

To prepare these 9β,11β-oxido 21-unsubstituted compounds, a steroid of the general formula

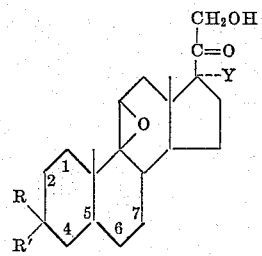

wherein at least one of the positions 1,2; 4,5; and 6,7 is double-bonded and R, R' and Z are as above-defined, is reacted with an alkanesulfonyl halide. Representative steroids suitable as initial reactants in the process of this invention include:

Δ⁴-pregnene-9β,11β-oxido-17α,21-diol-3,20-dione;
Δ⁴-pregnene-9β,11β-oxido-21-ol-3,20-dione;
Δ¹-pregnene-9β,11β-oxido-17α,21-diol-3,20-dione;
Δ¹-pregnene-9β,11β-oxido-21-ol-3,20-dione;
Δ¹-allopregnene-9β,11β-oxido-17α,21-diol-3,20-dione;
Δ¹-allopregnene-9β,11β-oxido-21-ol-3,20-dione;
Δ¹,⁴-pregnadiene-9β,11β-oxido-17α,21-diol-3,20-dione;
Δ¹,⁴-pregnadiene-9β,11β-oxido-21-ol-3,20-dione;
Δ⁴,⁶-pregnadiene-9β,11β-oxido-17α,21-diol-3,20-dione; and
Δ⁴,⁶-pregnadiene-9β,11β-oxido-21-ol-3,20-dione.

[The Δ¹-, Δ¹,⁴- and Δ⁴,⁶-steroid reactants can be prepared as disclosed in the applications of Josef Fried, Serial Nos. 489,769, now U.S. Patent No. 3,101,332, and 517,917, now abandoned, filed February 21, 1955, and June 24, 1955, respectively.]

These steroids are reacted with an alkanesulfonyl halide (sulfonyl chlorides being preferred, but other halides, such as bromides and iodides, being utilizable). Although alkanesulfonyl chlorides generally are utilizable, the alkane group is preferably a lower alkane, methanesulfonyl chloride (mesyl chloride) being especially preferred. The reaction is carried out by intermixing the steroid and alkanesulfonyl halide under substantially anhydrous conditions, preferably in the cold (e.g. at a temperature less than about 20° C.), in the presence of pyridine or other organic base.

The reaction results in the production of new intermediate steroids containing in the 21-position an alkanesulfonyloxy radical, the alkyl group of which corresponds to the alkanesulfonyl halide used in the reaction. The preferred intermediate 21-alkanesulfonyloxy compounds of this invention are those of the following general formula

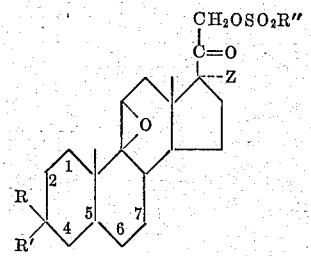

wherein at least one of the positions 1,2; 4,5; and 6,7 is double-bonded, and wherein R″ is alkyl (preferably lower alkyl), and R, R′ and Z are as hereinbefore defined.

These 21-alkanesulfonyloxy intermediates are then reacted with a metal iodide (such as an alkali metal iodide, and especially sodium iodide) in an organic solvent. The reaction is preferably, but not necessarily conducted at an elevated temperature (e.g. at reflux). The nature of the product will depend on the organic solvent selected; thus, if an acidic solvent, such as a lower alkanoic acid (particularly glacial acetic acid), is chosen, the 21-unsubstituted final products of this invention are obtained directly, whereas if a neutral solvent, such as an alcohol or a ketone (particularly acetone), is selected, then the 21-iodated intermediates of this invention are produced. The preferred 21-iodo compounds of this invention are those of the general formula

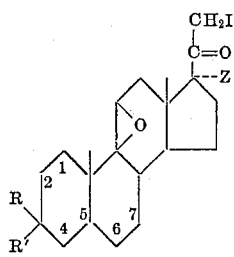

wherein at least one of the positions 1,2; 4,5; and 6,7 is double-bonded, and wherein R, R′ and Z are as hereinbefore defined.

These 21-iodo intermediates can then be converted to their 21-unsubstituted derivatives, either in situ or in a second step. This is done by reacting (preferably by heating) the 21-iodo intermediates with a reducing agent, such as an electropositive metal (e.g., zinc) or an alkali metal iodide in an acidic solvent, or a metal bisulfite (such as an alkali metal bisulfite, especially sodium bisulfite) in an inert solvent, such as an aqueous organic solvent (e.g. water-dioxane), to prepare the final products of this invention.

The steroids of the pregnane (including the pregnene, allopregnene, pregnadiene and allopregnane) series of this invention, which are unsubstituted in the 21-position and have a 9β,11β-oxido substituent, are known compounds utilizable as intermediates in the preparation of physiologically-active 9α-halo 11β-hydroxy (or 11-keto) derivatives. Suitable processes for these conversions are disclosed in the U.S. applications of Fried, Serial No. 417,489, filed March 10, 1954, now U.S. Patent No. 2,852,511, and Serial No. 489,769, filed February 21, 1955; now U.S. Patent No. 3,101,337.

The following examples are illustrative of the invention (all temperatures being in centigrade):

EXAMPLE 1

$\Delta^4$-pregnene-9β,11β-oxido-17α,21-diol-3,20-dione 21-mesylate

To a solution of 406 mg. of $\Delta^4$-pregnene-9β,11β-oxido-17α,21-diol-3,20-dione in 8 ml. of anhydrous pyridine is added at 0° a solution of 0.125 ml. methanesulfonyl chloride in 2 ml. of chloroform. After 2½ hours at 0° a small piece of ice is added and the mixture concentrated to small volume in vacuo. Chloroform is added and the resulting solution is extracted with water, dilute sulfuric acid, water, dilute sodium bicarbonate and again with water. After drying over sodium sulfate, the solvent is evaporated to dryness in vacuo and the resulting crystalline residue crystallized from 95% ethanol. The pure mesylate has the following properties, M.P. about 174° (dec.); $[\alpha]_D^{23}$ +21° (c., 0.76 in chloroform);

$\lambda_{max.}^{alc.}$ 243mμ (ε = 15,200); $\lambda_{max.}^{Nujol}$ 3.02μ (hydroxyl);

5.75μ (20-keto), 6.07μ, 6.18μ ($\Delta^4$-3-ketone)

*Analysis.*—Calcd. for $C_{22}H_{30}O_7S$ (438.46): C, 60.26; H, 6.90; S, 7.29. Found: C, 60.24; H, 6.68; S, 7.04.

In a similar manner by substituting an equivalent amount of the following for the $\Delta^4$-pregnene-9β,11β-oxido-17α,21-diol-3,20-dione in the foregoing example, the respective 21-mesylates are obtained: $\Delta^4$-pregnene-9β,11β - oxido-21-ol-3,20-dione; $\Delta^1$-pregnene-9β,11β-oxido-17α,21-diol-3,20-dione; $\Delta^1$-pregnene-9β,11β-oxido-21-ol-3,20 - dione; $\Delta^1$-allopregnene-9β,11β-oxido-17α,21-diol-3-20-dione; $\Delta^1$-allopregnene-9β,11β-oxido-21-ol-3,20-dione; $\Delta^{1,4}$ - pregnadiene - 9β,11β-oxido-17α,21-diol-3,20-dione; $\Delta^{1,4}$-pregnadiene-9β,11β-oxido-21-ol-3,20-dione; $\Delta^{4,6}$-pregnadiene-9β,11β-oxido-17α,21-diol-3,20-dione; and $\Delta^{4,6}$-pregnadiene-9β,11β-oxido-21-ol-3,20-dione.

Further, other sulfonyl halides, such as the lower alkanesulfonyl chlorides (e.g. ethanesulfonyl chloride), may be substituted for the mesyl chloride in Example 1 to yield the corresponding 21-alkanesulfonyloxy (e.g. ethanesulfonyloxy) derivative.

EXAMPLE 2

21-iodo-$\Delta^4$-pregnene-9β,11β-oxido-17α-ol-3,20-dione

A solution of 100 mg. of $\Delta^4$-pregnene-9β,11β-oxido-17α-ol-3,20-dione 21-mesylate and 300 mg. of sodium iodide in 3 ml. of acetone is refluxed for 10 minutes. Water is added and the acetone removed in vacuo. The residual suspension is extracted with chloroform and the chloroform solution extracted with dilute sodium sulfite solution and with water. Evaporation of the solvent in vacuo furnishes essentially pure 21-iodo-$\Delta^4$-pregnene-9β,11β-oxido-17α-ol-3,20-dione having the following properties: M.U. about 134° (dec.); $[\alpha]_D^{23}$ 0° (c., 0.82 in chloroform);

$\lambda_{max.}^{alc.}$ 243mμ (ε = 14,900); $\lambda_{max.}^{Nujol}$ 2.90μ (OH); 5.80

(20-keto); 6.01μ, 6.14μ ($\Delta^4$-3-ketone)

*Analysis.*—Calcd. for $C_{21}H_{27}O_4I$ (470.34): C, 53.63; H, 5.78; I, 26.98. Found: C, 54.28; H, 5.46; I, 27.34.

Similarly, the 21-mesylates of the following can be converted into their respective 21-iodo derivatives:

$\Delta^4$-pregnene-9β,11β-oxido-21-ol-3,20-dione;
$\Delta^1$-pregnene-9β,11β-oxido-17α,21-diol-3,20-dione;
$\Delta^1$-pregnene-9β,11β-oxido-21-ol-3,20-dione;
$\Delta^1$-allopregnene-9β,11β-oxido-17α,21-diol-3,20-dione;
$\Delta^1$-allopregnene-9β,11β-oxido-21-ol-3,20-dione;
$\Delta^{1,4}$-pregnadiene-9β,11β-oxido-17α,21-diol-3,20-dione;
$\Delta^{1,4}$-pregnadiene-9β,11β-oxido-21-ol-3,20-dione;
$\Delta^{4,6}$-pregnadiene-9β,11β-oxido-17α,21-diol-3,20-dione; and
$\Delta^{4,6}$-pregnadiene-9β,11β-oxido-21-ol-3,20-dione.

EXAMPLE 3

$\Delta^4$-pregnene-9β,11β-oxido-17α-ol-3,20-dione

To a solution of 500 mg. of 21-iodo-$\Delta^4$-pregnene-9β,21-oxido-17α-ol-3,20-dione in 10 ml. of glacial acetic acid is added 300 mg. of zinc dust and the resulting suspension shaken for 15 minutes at room temperature. The mixture is filtered and the filtrate concentrated to small volume in vacuo. Chloroform is added and the resulting solution is extracted with water, dilute sodium bicarbonate and again with water. The chloroform solution is dried over sodium sulfate and evaporated to dryness in vacuo. The residue upon crystallization from acetone-hexane furnishes $\Delta^4$-pregnene-9β,11β-oxido-17α-ol-3,20-dione identified by comparison with an authentic sample.

*Analysis.*—Calcd. for $C_{21}H_{28}O_4$ (344.44): C, 73.22; H, 8.89. Found: C, 73.30; H, 7.92.

$\Delta^4$-pregnene-9β,11β-oxido-17α-ol-3,20-dione can also be obtained by reduction of the corresponding 21-iodo compound with sodium bisulfite in dioxane-water.

Similarly, the 21-iodides of $\Delta^4$-pregnene-9β,11β-oxido 3,20-dione, the following can be converted to their respective 21-unsubstituted derivatives:

Δ⁴-pregnene-9β,11β-oxido-3,20-dione;
Δ¹-pregnene-9β,11β-oxido-17α-ol-3,20-dione;
Δ¹-pregnene-9β,11β-oxido-3,20-dione;
Δ¹-allopregnene-9β,11β-oxido-17α-ol-3,20-dione;
Δ¹-allopregnene-9β,11β-oxido-3,20-dione;
Δ¹,⁴-pregnadiene-9β,11β-oxido-17α-ol-3,20-dione;
Δ¹,⁴-pregnadiene-9β,11β-oxido-3,20-dione;
Δ⁴,⁶-pregnadiene-9β,11β-oxido-17α-ol-3,20-dione; and
Δ⁴,⁶-pregnadiene-9β,11β-oxido-3,20-dione.

Δ⁴-pregnene-9β,11β-oxido-17α-ol-3,20-dione can also be prepared directly from Δ⁴-pregnene-9β,11β-oxido-17α,21-diol-3,20-dione 21-mesylate, as illustrated by the following example:

EXAMPLE 4

A solution of 200 mg. of Δ⁴-pregnene-9β,11β-oxido-17α,21-diol-3,20-dione 21-mesylate and 600 mg. of sodium iodide in 20 ml. of glacial acetic acid is refluxed for one hour. The mixture is concentrated to small volume and diluted with chloroform. The chloroform solution is washed with sodium sulfite solution, water, sodium bicarbonate solution and again with water. After drying over sodium sulfate, the chloroform is evaporated in vacuo, and the resulting crystalline residue consisting of Δ⁴-pregnene-9β,11β-oxido-17α-ol-3,20-dione is recrystallized from acetone-hexane, furnishing Δ⁴-pregnene-9β,11β-oxido-17α-ol-3,20-dione identified by comparison with an authentic sample.

The 9β,11β-oxido steroids of the pregnane series, unsubstituted in the 21-position, can then be converted to the physiologically-active 9α-halo 11β-hydroxy (or 11-keto) derivatives disclosed in U.S. application, Serial No. 516,333 of Herz and Fried, filed June 17, 1955, now U.S. Patent No. 3,000,915, by reacting the former with the desired hydrogen halide (i.e. hydrofluoric acid, hydrochloric acid, hydrobromic acid, or hydroiodic acid) and then, if an 11-keto steroid is desired, oxidizing the resulting 9α-halo 11β-hydroxy product with a hexavalent chromium compound (e.g. chromic oxide).

The invention may be variously otherwise embodied within the scope of the appended claims.

We claim:

1. A compound selected from the group consisting of steroids of the formulae

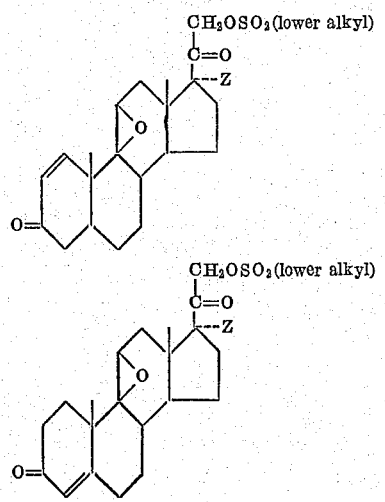

and

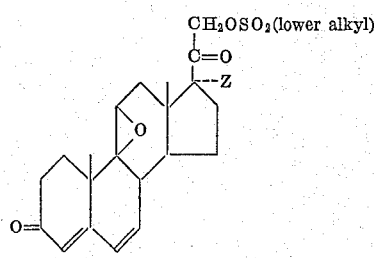

wherein Z is selected from the group consisting of hydrogen and α-hydroxy.

2. Δ⁴-pregnene-9β,11β-oxido-17α,21-diol-3,20-dione 21-(lower alkane) sulfonate.

3. Δ⁴-pregnene-9β,11β-oxido-17α,21-diol-3,20-dione 21-mesylate.

4. A process for preparing a 21-unsubstituted-9β,11β-oxido steroid of the pregnane series which comprises reacting the corresponding 21-iodo steroid with a reducing agent, selected from the group consisting of an electropositive metal, an alkali metal iodide in an acidic organic solvent and an alkali metal bisulfite in an inert solvent; and recovering the 21-unsubstituted steroid thus formed.

5. The process of claim 4 wherein the reducing agent is zinc.

6. The process of claim 4 wherein the reducing agent is an alkali metal bisulfite.

7. A process for preparing Δ⁴-pregnene-9β,11β-oxido-17α-ol-3,20-dione, which comprises reacting 21-iodo-Δ⁴-pregnene-9β,11β-oxido-17α-ol-3,20-dione with a reducing agent selected from the group consisting of an electropositive metal, an alkali metal iodide in an acidic organic solvent and an alkali metal bisulfite in an inert solvent, and recovering the 21-unsubstituted steroid thus formed.

References Cited by the Examiner

UNITED STATES PATENTS

| | | | |
|---|---|---|---|
| 2,684,968 | 7/54 | Bergstrom | 260—397.47 |
| 2,763,671 | 9/56 | Fried | 260—397.45 |
| 2,852,511 | 9/58 | Fried | 260—239.55 |
| 2,884,429 | 4/59 | Nathan et al. | 260—397.4 |
| 2,903,449 | 9/59 | Fried et al. | 260—239.55 |

OTHER REFERENCES

Fried: J. Am. Chem. Soc., May 5, 1953, pp. 2273–74; vol. 75.

LEWIS GOTTS, *Primary Examiner.*

H. SURLE, B. E. LANHAM, L. H. GASTON,
*Examiners.*